Sept. 1, 1970        J. H. LEMELSON        3,526,694

MOLDING TECHNIQUES

Filed Feb. 6, 1968

INVENTOR.
JEROME H. LEMELSON

United States Patent Office 3,526,694
Patented Sept. 1, 1970

3,526,694
MOLDING TECHNIQUES
Jerome H. Lemelson, 85 Rector St.,
Metuchen, N.J. 08840
Continuation-in-part of application Ser. No. 439,548,
Mar. 15, 1965. This application Feb. 6, 1968, Ser.
No. 703,289
Int. Cl. B29c 1/14, 5/06
U.S. Cl. 264—259                8 Claims

ABSTRACT OF THE DISCLOSURE

A method for molding is provided in which molding material is disposed against a flat surface in a molding cavity defined by a mold member is temporarily abutted to said surface. In one form, separate articles are intermittently molded against a plate or conveyor by an automatic molding apparatus. In another form, surface formations are provided against the surface of a preformed member by abutting said surface with a mold member having a cavity facing the surface and disposing a low-pressure molding material in said cavity. The mold member is retained against the surface until the molding material sets or solidifies in situ thereon and becomes secured thereto during the molding process.

RELATED APPLICATIONS

Figure 1:
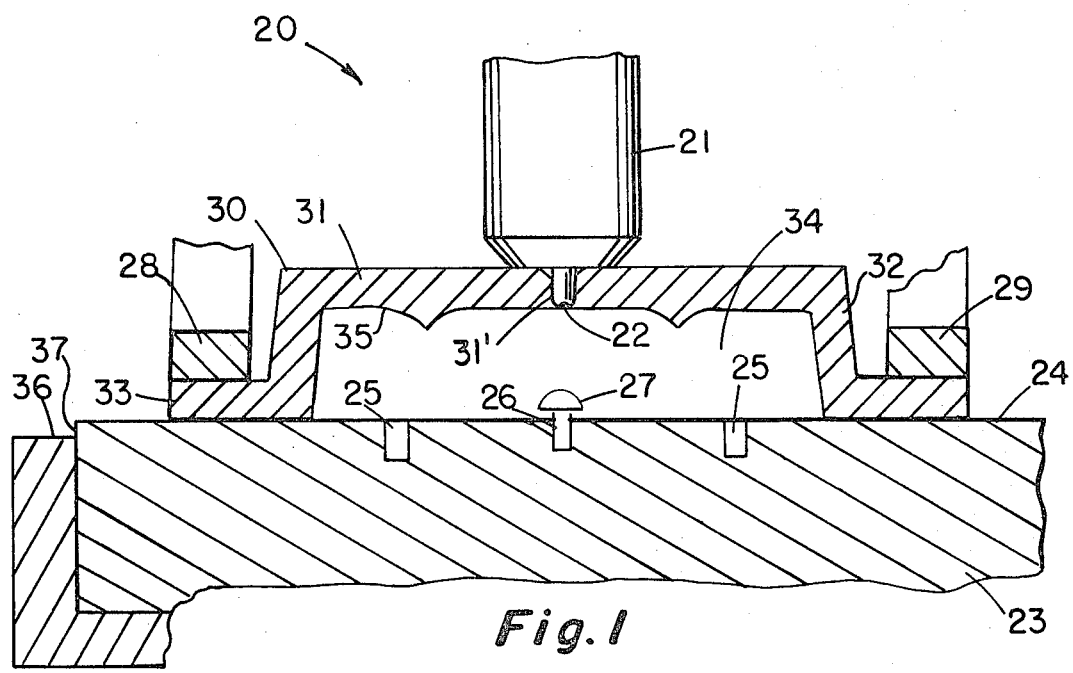

This is a continuation-in-part of copending application Ser. No. 439,548 filed Mar. 15, 1965 now U.S. Pat. No. 3,366,993, for Apparatus and Methods for Molding and having as a parent application Ser. No. 734,340 filed May 9, 1958 now U.S. Pat. No. 3,173,175.

This invention relates to molding techniques for molding articles in situ against a base member which base member may or may not form part of the finished article. In particular, the invention is defined by a molding technique utilizing a low-pressure molding material and an open mold which is brought into abutment with a surface such as the flat surface of a sheet or plate and retained thereagainst while molding material injected into the mold solidifies. Thereafter, the article is either retained in abutment and assembly with the surface against which it is molded upon removal of the mold therefrom or is removed completely from both the mold and the surface against which it is molded.

Accordingly, it is a primary object of this invention to provide a new and improved molding method for molding articles at low pressure.

Another object is to provide an improved method for automatically molding a plurality of articles of solid or hollow shape.

Another object is to provide a new and improved method for molding articles of low-pressure molding material against a surface which is movable with respect to a mold to permit removal of the article from the vicinity of the mold.

Another object is to provide a low-pressure molding method for decorating the surfaces of preformed articles or sheet material by molding in situ thereon.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 2:
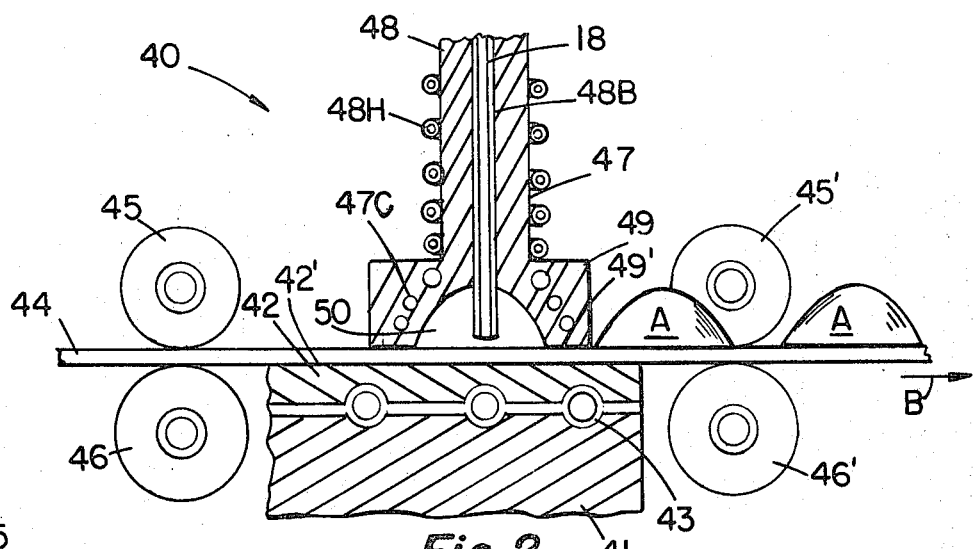

In the drawings:

FIG. 1 is a side view in cross section with parts broken away for clarity of a molding apparatus in a mold operative to mold articles or surface decorations against a preformed member, and FIG. 2 is a side view with parts broken away for clarity of a molding apparatus having means for conveying articles or mold decorated portions of a preshaped article into alignment with an open mold to permit further molding operations to be performed.

Figure 3:
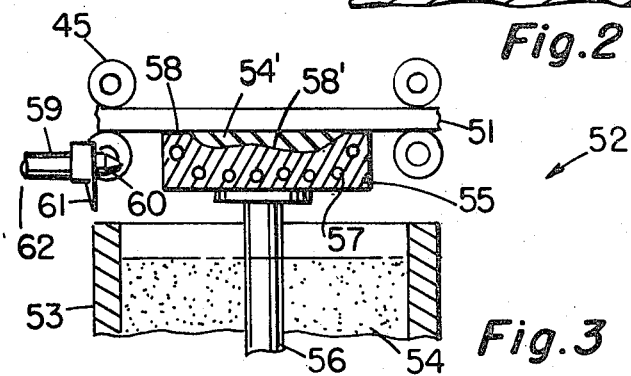

FIG. 3 is a side view in partial cross section of a modified form of the invention.

In FIG. 1 is shown a molding arrangement 20 in which low-pressure molding material is shaped by molding against the surface of a preformed shape 23 such as a sheet, plate or otherwise formed article of material having an outer surface 24 adapted to receive a mold member 30 for defining a molding cavity 34 therewith. In other words, the mold cavity 34 is formed by a portion of the surface 24 of member 23 and a portion of the surface of the mold 30.

The mold 30 is shown as having a sheet-like configuration with a flange 33 circumscribing a side wall 32 which terminates at an outer wall 31. A hole 31' provided in the outer wall 31 permits access of the end 22 of a nozzle 21 utilized to inject molding material into the volume 34.

The mold 30 is maintained against the surface 24 of the sheet or slab 23 by clamping means comprising a frame, clamps or bars 28 and 29 which compress the flange 33 against surface 24 to prevent the outflow of molding material from volume 34. The clamping means 28, 29 may be of any suitable design and may be held against the flange 33 by a servo means, screw means or fasteners. Fasteners may also be applied directly to the flange 33 into holes provided in member 23 if sealingly secured to said flange during the molding operation.

If it is desired to retain the article molded in cavity 34 against the surface 24 of member 23, the adhesive characteristics of the molding material may be used to bond the two materials together or a plurality of cavities, one of which 25 is shown in FIG. 1, may be provided in the surface 24 to receive portions of the molding material for fastening the molding to the substrate 23 upon solidification of said molding material. Also shown in FIG. 1 is a stud or fastener 27 secured in a threaded hole 26 in the surface of member 23. By molding material over and around the head of stud 27 the molded material may be fastened to the surface 24.

After the injection of molding material from nozzle 21 which may be automatically or manually positioned with its end 22 inserted in the hole 31' in the mold wall 31, the nozzle may be removed and a plug inserted into hole 31', if necessary.

The nozzle 21 may also be maintained compressing mold member 30 against the surface 24 until the molding material has solidified thereby eliminating the need to fasten or clamp the flange 33 against member 23.

Molding materials which may be injected through nozzle 21 into volume 34 in the arrangement of FIG. 1 may include such low pressure materials as various polymers, metal or ceramic materials such as mortars or cement. Self-expanding plastics which form cellular moldings may also be injected as a predetermined quantity into the volume 34 and allowed to expand in situ against surface 24 to fill the molded volume 34.

It is also noted that the molding material injector 21 may include means for projecting the injection nozzle 22 deep within the volume 34 so that a certain amount of molding material may be withdrawn from the core portion of the molding volume after the remainder of the molding material has solidified in situ against surface 24 and the inside surface of the mold 30. If such core material is withdrawn before its solidification, the shape formed against surface 24 will be hollow in nature.

Notation 35 refers to the surface of the mold cavity wall which may be smooth or irregular in shape as shown for providing raised or indented designs in the surface of the material molded in the volume 34.

Notation 36 refers to a prepositioning and holding means for member 23 against which prepositioning means an end wall 37 of said member may be secured or abutted. The member 23 may, in addition to comprising a sheet, slab or plate, also comprise an article of manufacture such as a container or a wall, plaque or other device against which it is desired to mold one or more shapes to be secured thereto for decorative or functional purposes.

If the molding material is injected into the molding cavity 34 in a hot molten condition and the member 23 is made of or coated with a thermoplastic material the outer stratum of which is rendered molten by said molten molding material, then upon solidification thereof the molding material may become fusion welded to the member 23. Molten polymers, ceramics or metal may thus be injected or otherwise disposed in the cavity 34 to be solidified in situ and bonded to the base or substrate 23. Cold setting materials such as mortars, portland cement or casting resins may also be cast in situ against substrates for decorative or functional purposes by the means provided in FIG. 1.

Depending on the characteristics of the molding material when disposed in the molding cavity 34, the mold 30 may be made of die formed sheet metal, cast or molded metal, ceramic or plastic materials. If the molding material is a ceramic, mortar, resin or other material which is cast or molded at a relatively low temperature, the surface 24 of base 23 which is aligned with the cavity 34 may be coated with a thermoplastic resin or adhesive prior to introducing the molding material thereagainst to serve as a means for bonding the molding against said surface. The adhesive may also be used to temporarily bond the flange or rim portion 33 of the mold to the substrate 23 to sealingly retain same in place as described during the molding operation until stripped or removed therefrom upon solidification of the molding material.

In FIG. 2, a modified form of the molding apparatus of FIG. 1 is shown for molding articles or decorations A against selected surface areas of a driven or conveyed sheet or plate 44. The apparatus 40 includes guide and drive means for the sheet 44 in the form of a plurality of powered rollers two pairs of which are denoted 45, 46 and 45', 46' in the view illustrated and which are operative to grip the lateral border portions of the sheet 44. The sheet 44 is driven over a base 41 having an upper platen 42 with an upper surface against which the bottom surface of sheet 44 may be compressed during the molding operation by the rim portion 49' of a mold head 49 which is shown supported on an arm 48 forming part of a molding machine assembly 47. The molding machine includes means (not shown) for reciprocably moving arm 48 to bring the rim portion 49' of the mold head 49 into surface abutment and sealing engagement with the upper surface of member 44 to close off the open cavity 50 of the mold during the molding operation and, after molding is complete, to retract said head to clear the molded piece so that member 44 may be driven in the direction of arrow B to remove the molded article from the vicinity of the mold to permit a repetition of the described molding cycle. Molding material is admitted to the cavity 50 through a tube 18 disposed in a bore extending through arm 48 and designated 48B. If the tube 18 is reciprocably mounted in the arm 48 and means, as defined in said parent application Ser. No. 734,340, is provided for projecting the end of tube 18 into the cavity 50 during the molding operation and removing same therefrom, then the molding material present in molten or liquid state in the core of the molding after a shell has been formed against the wall of the cavity 50, may be removed therefrom to form a hollow article against the surface of member 44. Accordingly, the molding apparatus 47 includes in addition to motor operated means for advancing sheet 44, and motor operated means for advancing and retracting arm 48, additional means for advancing and retracting tube 18 a predetermined degree and means for controlling the flow of molding material as described to effect the desired molding operation. All of these described operating means are preferably controlled in their operation by a single controller such as a multicircuit timer of the resetting type and adjusted to effect timed movements as described for molding and removing molded articles A from the vicinity of the molding head.

To facilitate molding and reduce the cycle time, means are provided in FIG. 2 for transferring heat relative to the molding apparatus and material. Notation 48H refers to an electrical resistance or induction heating coil shown surrounding the arm 48 which coil may also extend through or around the molding head 49. When electrically energized, the coil 48H may be used to generate heat in the arm 48 and tube 18 for maintaining molten molding material therein in a molten state. If the molding material is a thermosetting resin, heat generated by coil formation 48H may be used to cure the resin in the mold cavity 50 after excess resin has been removed from the inlet tube 18. Furthermore, the heating means 48H may be so designed and disposed in head 49 to heat the portion of member 44 aligned with the mold cavity to a temperature and condition whereby the molding material disposed therein will weld or fusion bond to the surface of member 44 upon its solidification.

Disposed between platen 42 and the base 41 and in surface contact with both is a tubed sheet 43 through which a heat transfer fluid may be pumped to transfer heat from the molding material in the mold cavity and to more rapidly set or solidify same. Notation 47C refers to a cavity in the mold wall through which a heat transfer fluid may be flowed during the molding operation for the purposes described. Operation of all the heat transfer means described may be predeterminately controlled by the same multicircuit timer or controller used to control the described movements of the mold and member 44 by controlling the operations of pumps and activating electrical switches for controlling the flow of heat transfer fluid and energizing the heating means 48H.

In FIG. 3 is shown a molding apparatus 52 employing a mold member 55 having a cavity 58' in its upper surface 58 which upper surface is adapted to abut the surface of an article or sheet 51 for providing decorative or functional material molded in situ thereagainst as described. Provision of molding material in the cavity 58' is effected by lowering the mold 55 into a container 53 having a molding material 54 disposed therein in liquid or fluidized state. Mold member 55 is supported on an arm 56 which may be the shaft of a hydraulic or pneumatic ram supported in or below container 53. The molding material 54 may comprise a molten or liquid polymer of fluidized particles of thermoplastic polymer which substantially fill the cavity 58' upon lifting head 55 out of the container 53 and are thereafter rendered into a molten or semi-molten mass in said cavity by auxiliary heat applied to the mold 55 and/or member 51 as described. Notation 57 refers to passageways through the mold wall which may contain induction or heating coil means as described for heating same and the plastic particles to a molten state.

Other features of the apparatus 52 of FIG. 3 include the provision of a device 59 which is operative to remove excess or unwanted liquid or particles of plastic from the upper surface 58 of the mold 55 before engaging same against the surface of member 51. The device 59 includes an arm 62 having a wiping element 61 in the form of a blade which is preferably made of silicone rubber or Teflon and is operative to wipe or scape molding material from the surface 58 by motor driven sweeping movement of said blade across said surface when the mold is predeterminately stopped above container 53.

Upon retraction of the arm 59 to clear the mold 55, the automatic controller described controls the operation of the servo moving shaft 56 to cause the mold 55 to move upwardly and engage the surface of member 51 which is held in place by a positioning means (not shown) of the types shown in FIGS. 1 or 2, or any other suitable transfer means.

It is noted that while the devices shown in FIGS. 2 and 3 reciprocably move the dies or molds against and away from the surfaces of the members 44 and 51 adapted to receive the molding material, said molds may be provided as a circular array of molds which are rotated into position against a power driven sheet or respective of a plurality of articles which are individually positioned by automatic transfer means with respect to each molding cavity when aligned therewith for performing the desired molding or decorating operations thereon.

Notation 60 refers to a nozzle at the end of arm 59 through which air or gas may be blown to remove molding material from the surface 58 of the mold. The nozzle 60 may also be used to flow molding material to the cavity 58' when aligned thereover by the means described. In a third mode of operation, the nozzle 60 may be used to direct a hot gas against particulate molding material disposed in cavity 58' to melt same prior to applying the mold to the surface of member 51.

I claim:
1. A method of molding comprising:
providing a mold member having an open molding cavity disposed in one face thereof with said mold member having a rim portion circumscribing said cavity,
abutting said rim portion of said mold member against a surface of a second member which surface extends beyond said rim portion and serves to close off said cavity,
sealing said one face of said mold member to said abutting surface of said second member to prevent the leakage of molding material therefrom,
disposing a predetermined quantity of molding material in the cavity volume defined by the abutted members and causing said molding material to cover the surface of the cavity and the surface of said second member disposed within the center portion of said mold member,
solidifying a portion of said molding material which abuts the walls of the mold cavity and said second member to the shape defined by the cavity wall of said mold member and said second member and, when said molding material has sufficiently set to maintain its shape,
removing molding material from the interior of the solidified portion of said molding material so as to form a hollow object in situ against the surface of said second member, and
removing said mold member from the surface of said second member while maintaining the molded article against said second member.

2. A method in accordance with claim 1, including the step of securing the molding to the surface of the second member during the molding process.

3. A method in accordance with claim 2 whereby the securing of said molding to the surface of said second member is effected by fusion bonding the two together when the molding material solidifies in situ on the surface of said second member.

4. A method in accordance with claim 2 whereby the securing of said molding to the surface of said second member is effected by welding the two surfaces together during the molding process.

5. A method in accordance with claim 2 whereby the securing of said molding to the surface of said second member is effected by generating radiant energy such as electrically generated induction energy and passing said energy through said mold member to heat the surface stratum of said second member aligned with said mold member sufficiently to effect fusion welding or bonding between the molding and said second member upon solidification of said molding material.

6. A method in accordance with claim 2 whereby the securing of said molding to the surface of said second member is effected by securing headed fastener means to the surface of said second member defining the wall of the molding cavity and solidifying said molding material over and around the head of said fastening means to mechanically fasten the molding to said second member during the molding process.

7. A method in accordance with claim 3 whereby said molding material and said second member are made of substantially castable low pressure molding materials selected from the group comprising castable resins, ceramics and metals.

8. A method of molding comprising:
providing a mold member having an open molding cavity disposed in one face thereof with said cavity being surrounded by a circumscribing rim,
abutting said rim of said mold member against a surface of a sheet member having said surface extending beyond said rim so as to close off said cavity.
sealing said rim of said mold member to the surface of said sheet to seal the cavity and said mold member sufficiently to prevent the leakage of molding material therefrom,
disposing a predetermined quantity of fluent, low-pressure molding material in the cavity volume defined by the abutted mold member and sheet and causing said molding material to contact substantially the entire area of the wall of said cavity and the surface of said sheet enclosed by said rim of said mold member,
solidifying said molding material to form a hollow body, and
removing said mold member from the surface of said sheet while maintaining said hollow body in abutment with and secured to said sheet.

References Cited

UNITED STATES PATENTS

| | | | |
|---|---|---|---|
| 2,291,545 | 7/1942 | Ganz | 264—328 XR |
| 2,291,862 | 8/1942 | Bailey | 264—25 XR |
| 2,415,961 | 2/1947 | Nast | 18—42 |
| 2,731,671 | 1/1956 | Zimmerman | 264—135 |
| 2,777,411 | 1/1957 | Geisler | 264—328 XR |
| 3,176,057 | 3/1965 | Peters | 264—266 |
| 3,196,485 | 7/1965 | Battonfeld | 78—5.3 |
| 3,246,066 | 4/1966 | Gits | 264—132 |
| 1,939,894 | 12/1933 | Goodwin | 264—254 |
| 2,277,543 | 3/1942 | Downs | 264—246 |
| 2,313,985 | 3/1943 | Bradshaw | 264—266 XR |
| 2,619,679 | 12/1952 | Baldanza | 264—316 XR |
| 2,841,863 | 7/1958 | Geisler | 264—328 XR |
| 2,991,506 | 7/1961 | Crandall | 264—328 XR |
| 3,071,817 | 1/1963 | Laporte | 264—308 XR |

ROBERT F. WHITE, Primary Examiner

R. R. KUCIA, Assistant Examiner

U.S. Cl. X.R.
264—135, 269, 279, 308, 328